(12) United States Patent
Reid et al.

(10) Patent No.: US 8,020,039 B2
(45) Date of Patent: Sep. 13, 2011

(54) RECOVERING FROM ERRORS IN STREAMING DSP APPLICATIONS

(75) Inventors: Alastair David Reid, Cambridgeshire (GB); Daryl Wayne Bradley, Cambridgeshire (GB)

(73) Assignee: ARM Limited, Cambridge (GB)

( * ) Notice: Subject to any disclaimer, the term of this patent is extended or adjusted under 35 U.S.C. 154(b) by 179 days.

(21) Appl. No.: 12/292,944

(22) Filed: Dec. 1, 2008

(65) Prior Publication Data

US 2009/0150722 A1    Jun. 11, 2009

(30) Foreign Application Priority Data

Dec. 6, 2007 (GB) .................................. 0723929.6

(51) Int. Cl.
*G06F 11/00* (2006.01)
(52) U.S. Cl. ................... 714/10; 714/2; 714/15; 714/48; 714/51
(58) Field of Classification Search ................ 714/2, 10, 714/11, 15, 25, 37, 47, 48, 51, 55, 47.1
See application file for complete search history.

(56) References Cited

U.S. PATENT DOCUMENTS

| | | | | |
|---|---|---|---|---|
| 5,043,990 | A * | 8/1991 | Doi et al. | 714/48 |
| 6,457,119 | B1 * | 9/2002 | Boggs et al. | 712/227 |
| 6,543,028 | B1 * | 4/2003 | Jamil et al. | 714/52 |
| 7,467,325 | B2 * | 12/2008 | Eisen et al. | 714/10 |
| 2004/0243893 | A1 * | 12/2004 | Mudge et al. | 714/724 |
| 2008/0168305 | A1 * | 7/2008 | Gschwind et al. | 714/10 |
| 2008/0229145 | A1 * | 9/2008 | Bose et al. | 714/10 |
| 2008/0263379 | A1 * | 10/2008 | Tuuk et al. | 713/375 |
| 2009/0113240 | A1 * | 4/2009 | Vera et al. | 714/37 |

FOREIGN PATENT DOCUMENTS

WO    99/17202    4/1999

OTHER PUBLICATIONS

Great Britain Search Report for GB 0723929.6, mailed Feb. 15, 2008.
M. Bhardwaj et al., "The Renaissance A Residue Number System Based Vector Co-Processor for DSP Dominated Embedded ASICs", Conference Record of the Thirty-Second Asilomar Conference on Signals, Systems & Computers, 1998, Pacific Grove, CA, USA, Nov. 1-4, 1998., XP010324340.

* cited by examiner

*Primary Examiner* — Robert W Beausoliel, Jr.
*Assistant Examiner* — Joseph D Manoskey
(74) *Attorney, Agent, or Firm* — Nixon & Vanderhye P.C.

(57) ABSTRACT

A data processing system is provided in which processing circuitry performs at least one of a series of data processing operations in dependence upon a set of data values and control circuitry controls execution of the data processing operations. Control path error detection circuitry is provided for detecting a control path error associated with an error in operation of the control circuitry and data path error handling circuitry is arranged to handle recovery from errors in the data values. The control path error detection circuitry is configured to cause the data path error handling circuitry to perform recovery from detected control path errors enabling the series of data processing operations to continue despite the occurrence of the control path error. An associated method and computer program product are also provided.

21 Claims, 8 Drawing Sheets

RECOVERING FROM ERRORS IN STREAMING DSP APPLICATIONS

This application claims priority to Great Britain Application No. 0723929.6 filed 6 Dec. 2007, the entire contents of which are hereby incorporated by reference.

BACKGROUND OF THE INVENTION

1. Field of the Invention

This invention relates to the field of data processing systems. More particularly, this invention relates to error recovery in data processing systems.

2. Description of the Prior Art

It is known to provide data processing systems capable of handling errors in the input data. Data path errors are considered to be any errors induced in data values. Such data path errors could arise, for example, as a result of operations performed by an Arithmetic Logic Unit (ALU), a multiplier, a barrel shifter or indeed any part of a data processing system that processes or transmits data values.

Error detection and correction of data is commonly used to maintain data integrity across noisy communication channels and when stored on less-than-reliable storage media. For example, to handle errors in a radio signal transmitted from a base station to a receiver across a communication channel, the base station can send the data together with an error detection code, which the receiver uses to check for errors, and request retransmission of erroneous data. Either in addition to or as an alternative to retransmission, forward error correction (FEC) can be employed, which involves the base station encoding the data with an error-correcting code (e.g. using a Viterbi algorithm) and transmitting the coded message to the receiver. The receiver then decodes the received signal into the "most likely" data. The FEC codes are designed to enable the receiver to avoid misinterpreting the data despite the presence of noise on the communication channel.

It is also known to handle data path errors in data processing systems by adding supplementary hardware to perform duplicate calculations or to rerun part or all of the data processing. However, this approach can be inefficient since it typically involves adding a large degree of redundancy to the data processing system.

Although mechanisms for handling errors within data are routinely provided in data processing systems, most data processing systems are not configured to gracefully recover from control path errors. Control path errors include at least such as errors due to a temporary hardware failure, hardware design errors, timing errors, or errors in control of flow of execution of instructions. Indeed in known systems control path errors are likely to be handled by killing the whole application and restarting the calculation from scratch.

Thus there is a requirement to enable more efficient handling of control path errors.

SUMMARY OF THE INVENTION

According to a first aspect the present invention provides apparatus for processing data, said apparatus comprising:

processing circuitry for performing at least one of a series of data processing operations in dependence upon a set of data values;

control circuitry for controlling execution of said data processing operations;

control path error detection circuitry for detecting a control path error associated with an error in operation of said control circuitry;

data path error handling circuitry arranged to handle recovery from errors in said data values;

wherein said control path error detection circuitry is configured to cause said data path error handling circuitry to perform recovery from said control path error thereby enabling said series of data processing operations to continue.

The present invention recognises that control path errors can be recovered from more gracefully by redeploying data path error handling circuitry to perform recovery from control path errors thereby enabling a series of data processing operations to continue in the event that a control path error is encountered. This obviates the requirement to completely reboot the data processing system in the event that a control path error occurs. Since many data processing systems already have in place data path error handling circuitry, re-deployment of data path error handling circuitry for the purpose of handling control path errors (in addition to handling data path errors) improves efficiency by fully utilising available resources and is straightforward to implement since data path error handling circuitry is typically provided in known data processing systems. For example oversampling, normalisation and outlier suppression are used to suppress data path errors. Forward error correction such as Reed-Solomon codes, Viterbi codes and Turbo coding are typically used to correct data path errors whilst backward error correction such as cyclic redundancy checks (CRC) and packet retransmission/acknowledgement are typically used to recover from data path errors. The present invention enables redeployment of such known data path error handling circuitry to recover from control path errors by effectively converting control path errors which are hard to recover from into data path errors which can be readily recovered from by the data processing system.

Use of the data path error handling circuitry to perform recovery from detected control path errors avoids having to add duplicate hardware dedicated to handling control path errors and avoids having to rerun all or part of the data processing that was being performed when the control path error was encountered.

In data processing systems such as digital signal processing systems used by many communication devices, the use of the data path error handling circuitry to recover from control path errors extends the range of errors that can be recovered from without having to reconfigure the hardware and means that errors in the control plane need not interrupt the associated communication link or video display etc. According to the present invention, although the data processing system comprises control path error detection circuitry, it is less likely that there will be a need to add redundant hardware to compute redundant copies of answers in order to recover from control path errors.

In some situations adding redundant hardware to a data processing system to deal with control path errors can allow clean error recovery. However, there are many situations in which control path errors are common enough to have a potential adverse impact on the data processing yet are infrequent enough that any performance impact associated with detecting and recovering from the control path error whilst continuing to perform data processing operations is acceptable. Embodiments of the present invention can conveniently and efficiently deal with such control path errors.

It will be appreciated that the control path error detection circuitry could cause the data path error handling circuitry to recover from a detected control path error in a variety of different ways, such as the control path error detection circuitry causing an individual digital signal processing kernel to abort and triggering the data path error handling circuitry to clean up the state of the aborted kernel. However, in one embodiment, the control path error detection circuitry is arranged to cause the recovery from the control path error by providing an indication of the control path error by triggering generation of an error-recovery data element wherein the error recovery data element is supplied to the data path error handling circuitry.

It will be appreciated that the error-recovery data element could take a number of alternative forms such as a random output data or a partially reconstructed output of a data processing being performed when the control path error was detected. However, in one embodiment the error-recovery data element comprises a predetermined data pattern. One example of a predetermined data pattern would be a data element comprising all zeros.

It will be appreciated that the error-recovery data element comprising a predetermined data pattern can be used to enable data processing operations to continue and that the data path error handling circuitry could be separately triggered to recover from any detected control path errors. However in one embodiment, the predetermined data pattern is used to initiate the recovery from the control path error by the data path error handling circuitry.

In one embodiment, the predetermined data pattern comprises a plurality of data values each of which has a magnitude within a predetermined range. This makes the contents of the error-recovery data element more predictable and easier to handle by the data path error handling circuitry which performs the control path error recovery e.g. by making overflow/underflow errors less likely.

In one embodiment the error-recovery data element is a modified version of a calculation result of one of the plurality of data processing operations. Such modification of at least part of a calculation result enables any corrupt or out of bounds calculation results arising from control path errors to be compensated for thereby enabling forward progress of the series of data processing operations such that error recovery by the data path error handling circuitry can be invoked as and when required.

In some such systems where a calculation result comprises an associated probability value, the modified version of the calculation result corresponding to the error-recovery data element comprises a modified probability value. This is useful for processing circuitry configured to perform digital signal processing operations such as soft-input Viterbi decoding or soft-output QAM demodulation, since it provides a mechanism via which detection of a control path error can be readily communicated to the data path error handling circuitry in a form that should automatically invoke the data path error handling circuitry to recover from the detected control path error.

Although the present invention can be implemented in a data processing apparatus comprising a single processor or a state machine or indeed a hybrid processor/state machine system, in one embodiment the data processing apparatus comprises a plurality of processing modules wherein each of the plurality of processing modules performs a respective processing function. In one such embodiment at least a subset of the plurality of processing modules are connected in series and arranged to perform a respective series of data processing functions. In such series-type embodiments the data flow nature of the series of processing modules can be readily exploited to enable the data path error handling circuitry to be invoked at an appropriate point following detection of a control path error.

It will be appreciated that in data processing systems comprising a plurality of processing modules the control path error detection circuitry could detect the occurrence of an error in any one of the plurality of processing modules. However in one embodiment the control path error detection circuitry is arranged to detect the occurrence of a control path error in a given one of the plurality of processing modules. This enables the source of the control path error to be localised and appropriate decisions can then be made by the system with regard to whether or not recovery from the detected control path error by data path error handling circuitry should be performed by that same processing module or should be deferred to a subsequent processing module.

Although it is possible that the control path error detection circuitry could invoke data path error handling circuitry within the same one of the plurality of processing modules in which the control path error is detected to perform error recovery from the control path error, in one embodiment the control path error detection circuitry is arranged to cause the data processing apparatus to bypass one or more subsequent processing functions of the series of processing modules in response to a detection of the control path error in the given processing module. This provides more flexibility in the mechanism of recovery from the control path error using data path error handling circuitry and improves efficiency by enabling any redundant calculations to be bypassed prior to invoking the data path error handling circuitry to perform the error recovery e.g. by retransmission of data.

Although the data path error handling circuitry could be associated with the same one of the plurality of processing modules in which the control path error detection circuitry detected the control path error, in one embodiment the data path error handling circuitry used to recover from the detected control path error is associated with a further one of the plurality of processing modules different from the given processing module.

In embodiments in which the control path error detection circuitry is arranged to trigger generation of an error-recovery data element, the error recovery data element is supplied to the further processing module to enable the series of processing operations to continue despite occurrence of the control path error.

It will be appreciated that the control circuitry of the data processing apparatus that controls execution of the data processing operations could take on many and varied forms, but in one embodiment the control circuitry comprises a state machine. In one such embodiment the control path error detection circuitry detects the control path error in dependence upon a state of the state machine. For example, a control path error can be identified when the state machine should not be in the particular state at the corresponding point in time, based upon its inputs and previous state. This provides a control path error detection mechanism that is straightforward to implement.

It will be appreciated that the control path errors on which recovery is performed by the data path error handling circuitry could arise from many different types of malfunction of the data processing apparatus, but in one embodiment the control path is an error associated with at least one of a timing error, an intermittent hardware error, a hardware failure and a hardware design error.

It will be appreciated that the control path error detection circuitry could take on many different forms, but in one embodiment the control path error detection circuitry comprises at least one of a watchdog timer, a value-comparison circuit, a memory protection unit (e.g. control path error associated with an invalid access request within the MPU) and a single-event-upset detection circuit.

Embodiments in which the data processing system comprises a plurality of processing modules, the processing modules could be any type of processing module, but in one embodiment the plurality of processing modules comprises at least one of a digital signal processor, a processing engine, a general-purpose CPU, a programmable accelerator and a fixed-function accelerator.

It will be appreciated that the data path error handling circuitry used to perform recovery from a detected control path error could be any type of hardware capable of data path error handling. However, in one embodiment the data path error handling circuitry is arranged to invoke error-handling software to trigger recovery from the detected control path error. This provides a system that is easy to implement and the data path error handling mechanism can be readily adapted and updated through modifications to the software.

According to a second aspect the present invention provides a data processing method comprising:

performing a plurality of data processing operations on a set of data values in dependence upon one or more program instructions;

controlling execution of said program instructions using control circuitry;

detecting a control path error associated with an error in operation of said control circuitry;

handling recovery from data path errors corresponding to errors induced in said set of data values by said data processing operations using a data path error handling mechanism;

wherein an indication that a control path error has occurred is provided to said data path error recovery mechanism and wherein said data path error handling mechanism is responsive to said indication to trigger recovery from said control path error.

According to a third aspect, the present invention provides a computer program product carrying a computer program for controlling operation of a data processing apparatus having processing circuitry for performing at least one of a series of data processing operations in dependence upon a set of data values and control circuitry for controlling execution of said data processing operations, said computer program product comprising:

control path error detection code for detecting a control path error associated with an error in operation of said control circuitry;

data path error handling code for handling recovery from errors in said data values;

wherein said control path error detection code invokes said data path error handling code to perform recovery from said control path error thereby enabling said series of data processing operations to continue.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1A:
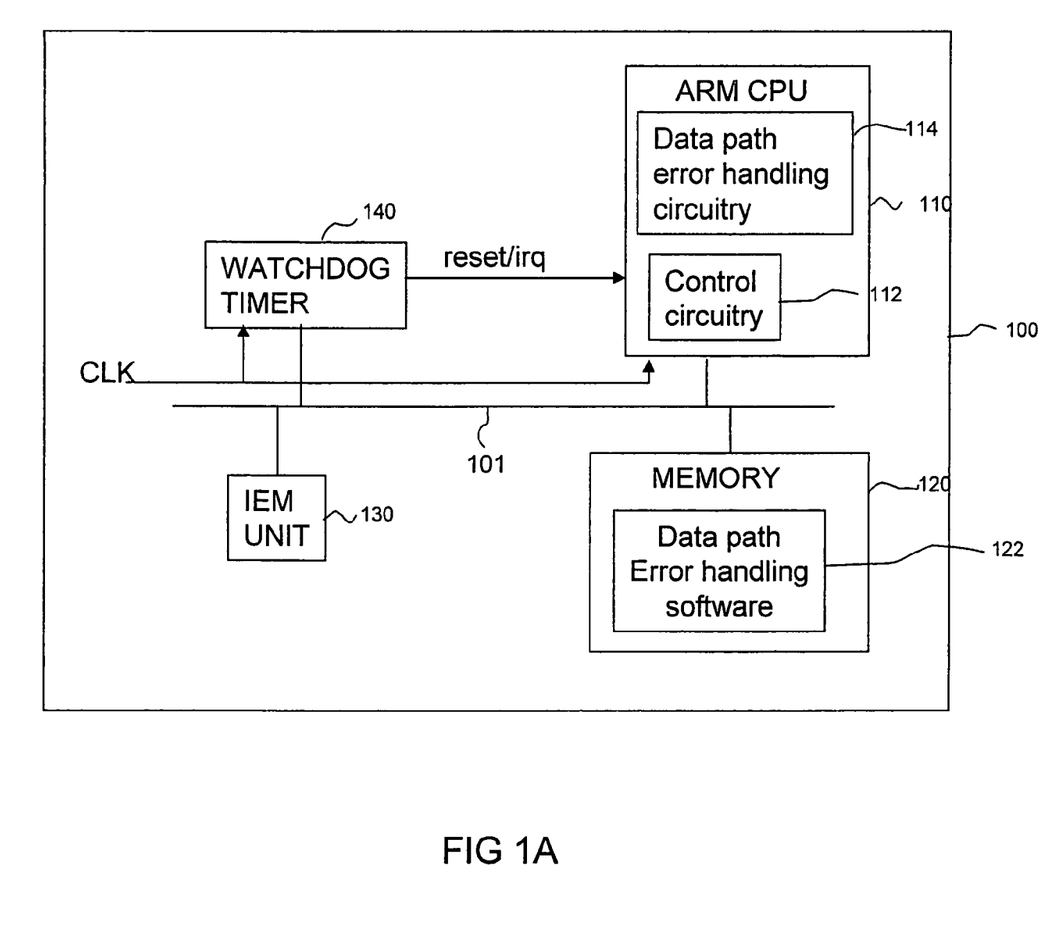
FIG. 1A schematically illustrates a data processing apparatus.

FIG. 1A schematically illustrates a data processing apparatus. The apparatus comprises an ARM processor 110 having control circuitry 112 and data path error-handling circuitry 114; a memory 120 storing data path error handling software 122; an Intelligent Energy Management (IEM) unit 130; and a watchdog timer 140.

The ARM processor performs processing operations by executing program instructions. The control circuitry 112 controls sequencing and synchronisation of execution of those instructions. The ARM processor 110 loads data from and stores data to the memory 120 via a bus 101. The memory 120 stores data path error handling software 122 which is executed by the processor 110 to effect recovery from data path errors. The data path error handling software 122 is loaded by the ARM processor 110 and executed using data the path error handling circuitry 114.

Note that the memory 120 in this particular embodiment is on-chip memory but in alternative arrangement the memory 120 resides off-chip. The IEM unit 130 controls operational parameters of the ARM processor 110 according to prevailing processing conditions such that the ARM processor 110 can be set to operate at a predetermined number of different processing frequencies and corresponding operating voltages. When the processor frequency is reduced, the voltage may be scaled down in order to achieve energy savings. The operating frequency and voltage of the ARM processor 110 is set by the IEM unit 130 in dependence upon the current processing workload and according to one or more performance policy prediction software applications for predicting an appropriate current processor operating level. If the processor performance level is set too low to cope with the current processing workload then data path errors and control path errors are likely to result. However, the data path error handling circuitry 114 and the watchdog timer 140 are arranged to handle and recover from at least some control path and data path errors.

The watchdog timer 140 is a hardware timing device that is capable of triggering a reset if some timeout based fault condition in operation of the ARM processor 110 is detected. The watchdog timer 140 is used to detect control path errors (e.g. an infinite loop in a software routine) and to interrupt or reset the ARM processor 110 should such a problem occur. The watchdog timer 140 is based on a counter that counts down from an initial value to zero (alternative embodiments count from zero up to a maximum value).

Software running on the ARM processor 110 selects the initial value of the counter and periodically restarts it. If the counter of the watchdog timer 140 ever reaches zero before the software restarts it then the software is assumed to be malfunctioning and a reset or interrupt (IRQ signal) is supplied from the watchdog timer 140 to the ARM processor 110. The reset signal effectively reboots the ARM processor 110.

In the arrangement of FIG. 1A, the watchdog timer 140 serves as control path error detection circuitry for detecting a control path error in software operating on the ARM processor 110. In the event that a control path error is detected by the watchdog timer 140, instead of performing a standard reset where the ARM processor 110 is rebooted, the watchdog 140 invokes the data path error handling circuitry 114 to execute the data path error handling software to effect recovery from the control path error. This allows the ARM processor 110 to make forward-progress with processing operations rather than having to completely reboot.

U.S. Pat. No. 7,278,080 (assigned to ARM Limited and University of Michigan), which is hereby incorporated by reference, describes an integrated circuit in which operating parameters of the integrated circuit, such as the clock frequency, the operating voltage, the body-biased voltage, temperature and the like are adjusted so as to maintain a finite non-zero error rate in a manner that increases overall performance. The control path errors, which can arise in such systems due to the finite non-zero error rate (e.g. timing violations on signal paths), can be handled according to the present technique whereby control path error detection circuitry causes data path error handling circuitry to perform recovery from detected control path errors. Note that since the IEM unit 130 of FIG. 1A varies the operating parameters of the ARM CPU 110 in a similar manner to the way that operating parameters are varied in U.S. Pat. No. 7,278,080, control path errors involving timing violations in signal paths are also likely to occur in the arrangement of FIG. 1A, and these are handled by the data path error handling software 122.

Figure 1B:
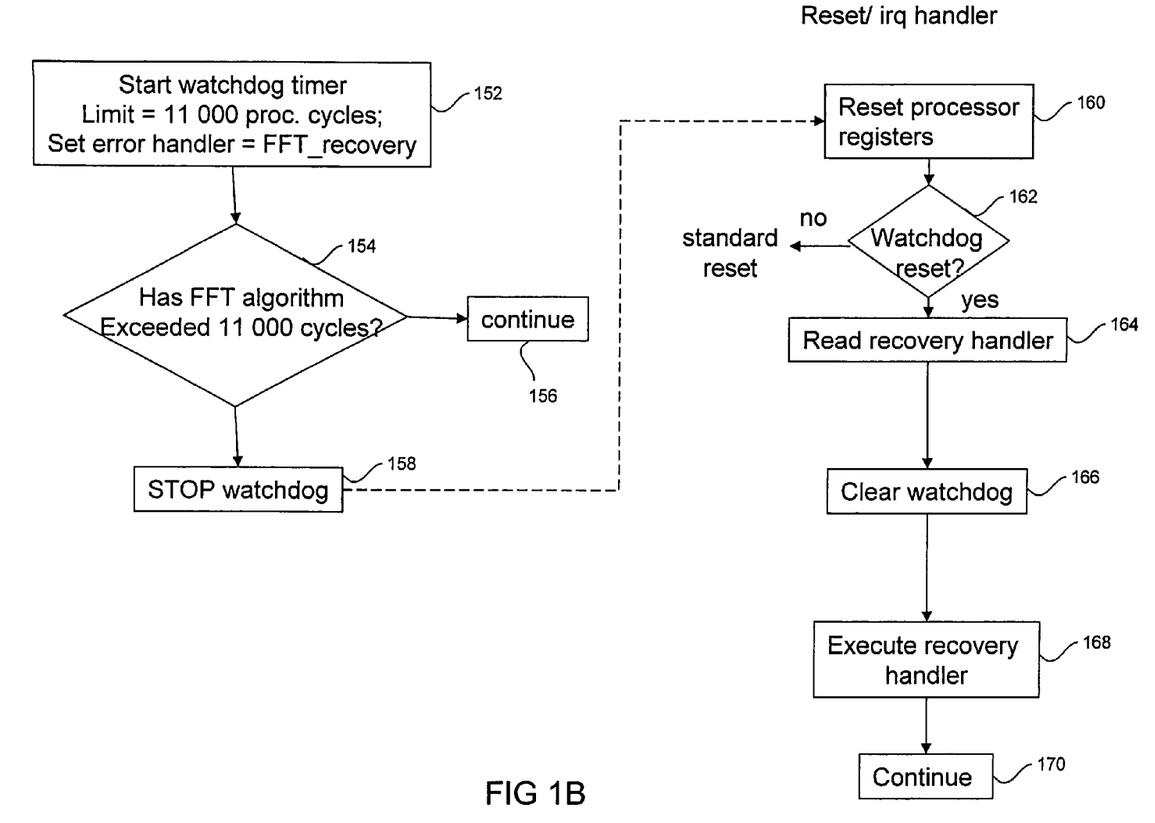
FIG. 1B is a flow chart that schematically illustrates how the watchdog timer 140 of FIG. 1A is used to detect a control path error and how the data path error handling circuitry 122 is used to cause recovery of the system from the detected control path error.

FIG. 1B is a flow chart that schematically illustrates how the watchdog timer 140 of FIG. 1A is used to detect a control path error and how the data path error handling circuitry 114 and software 122 is used to cause recovery of the system from the detected control path error.

The process begins at stage 152 whereupon the watchdog timer 140 is started and the counter is set to an initial value of 11000 processing cycles. Also at stage 152 the system is initialised such that the data path error handling software 122 is set to be an error handler associated with the watchdog timer 140. In this particular embodiment, the processing being performed by the ARM processor 110 is a Fast Fourier Transform calculation so the corresponding data path error handling software 122 is a Fast Fourier Transform (FFT) recovery program. The watchdog timer 140 is able to discriminate between a standard reset of the ARM processor 110, which would result in a complete reboot and a reset request that is triggered by the watchdog timer 140 due to a detected control path error.

After the initialisation stage 152, the process proceeds to stage 154 where it is determined whether or not the FFT algorithm executing on the ARM processor 110 has exceeded 11000 processing cycles. It is known that the FFT algorithm should execute for a maximum of 10000 processing cycles so if the counter of the watchdog timer has reached a value of zero, indicating that 11000 processing cycles have been exceeded, this provides an indication that the FFT algorithm is not operating correctly and a control path error has occurred.

If the watchdog timer 140 does not indicate that 11000 processing cycles have been exceeded then the process proceeds to stage 156 and the processing continues without any error recovery being invoked. If, on the other hand at stage 154, the watchdog timer 140 indicates that the FFT algorithm has been executing for in excess of 11000 cycles then the process proceeds to stage 158 whereupon the watchdog timer is stopped and a reset signal is supplied to the ARM processor 110. The process then proceeds to stage 160 where all of the registers of the ARM processor 110 are reset.

Following the register reset, the process proceeds to stage 162 where it is determined whether or not the reset has been triggered by the watchdog timer. If it is determined at stage 162 that the reset has not in fact been triggered by the watchdog timer 140, then the process follows a standard reset procedure and reboots the ARM processor. If on the other hand it is determined at stage 162 that the register reset at stage 160 was in fact triggered by the watchdog timer 140 then the process proceeds to stage 164 where the ARM processor 110 reads the predetermined recovery handler (FFT recovery routine) from the memory 120. Next at stage 166, the watchdog timer is cleared by initialising the counter to the value of 11000 cycles once again and at subsequent stage 168 the ARM processor executes the program instruction of the FFT recovery routine.

Thus the control path error that resulted from the FFT algorithm "hanging" by getting stuck in an infinite loop is recovered from using an FFT recovery software routine that generates a recovery packet by generating data that a later processing block can recover from. By causing the watchdog timer 140 to trigger invocation of the FFT recovery algorithm rather than to reboot the ARM processor 110, the ARM processor is able to continue processing despite detection of the control path error at stage 154. Thus control path errors that would otherwise result in a reset of the entire system are converted into data path errors enabling forward-progress of the calculations.

In the arrangement of FIGS. 1A and 1B, the watchdog timer 140 asserts that a control path error has occurred and data path error handling software is invoked to recover from the control path error. In alternative arrangements both assertion that a control path error has occurred and recovery from the control path error (by data path error handling software) are performed in software.

Figure 2:
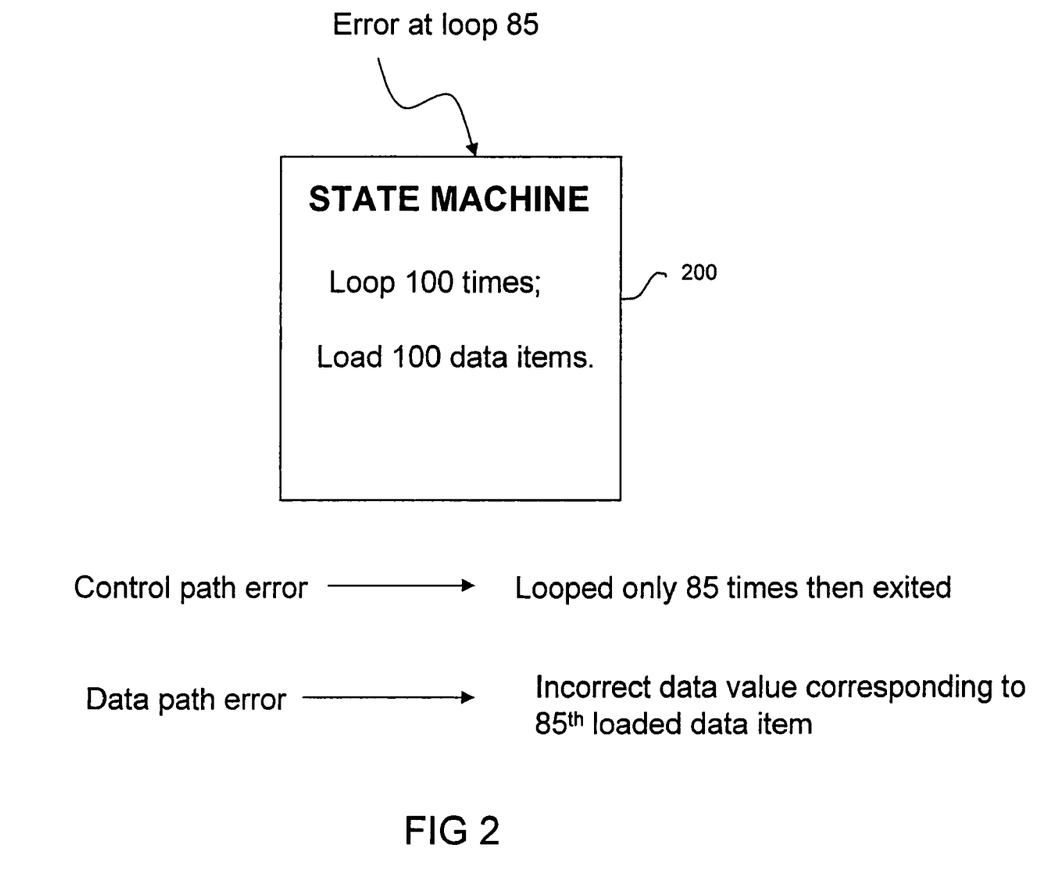
FIG. 2 schematically illustrates a state machine of a data processing apparatus according to the present technique.

FIG. 2 schematically illustrates a state machine operated by a data processing apparatus according to an embodiment of the present invention. The data processing apparatus according to the present technique may comprise a processor as in the arrangement of FIG. 1A, a state machine as illustrated in FIG. 2 or a hybrid between a processor and a state machine.

In the arrangement of FIG. 2, the state machine 200 comprises a model of behaviour composed of a finite number of states, transitions between those states and actions that give rise to transitions between the states. A given state of the state machine 200 stores information about the past and reflects changes in inputs to the state machine from the initialisation of the system to the point in time corresponding to that state. A transition indicates a state change that occurs when a corresponding condition is fulfilled. The state machine 200 performs actions corresponding to processing activities.

In the embodiment of FIG. 2, the state machine 200 is set up to execute a processing task comprising a loop of 100 iterations with a respective data item being loaded upon each iteration. The state machine 200 keeps track of which iteration of the loop is currently being performed. However, in this case a processing error occurs at loop 85 so that the full complement of 100 loops is not successfully completed. FIG. 2 schematically illustrates the difference between a control path error and the data path error. In particular a control path error associated with the error at loop 85 has arisen because the loop was iterated only 85 times before exiting and the last 15 loops were not completed. On the other hand a data path error is associated with the $85^{th}$ loaded data item having an incorrect data value, in this case a value that was out of range resulting in an overflow upon a division operation.

Control path error, such as the premature exit at loop 85 of 100 in FIG. 2, are errors associated with anything that controls the flow of execution or controls how data is processed. For example control path errors can be associated with instructions such as signals on an instruction bus, the order in which instructions are supplied for decoding, the selection of which instructions to execute at a particular time and the operation of instructions controlling cycling through loops. On the other hand data path errors, such as the out-of bounds $85^{th}$ loaded data item in FIG. 2, are any errors induced into data values associated with a computation.

Figure 3:
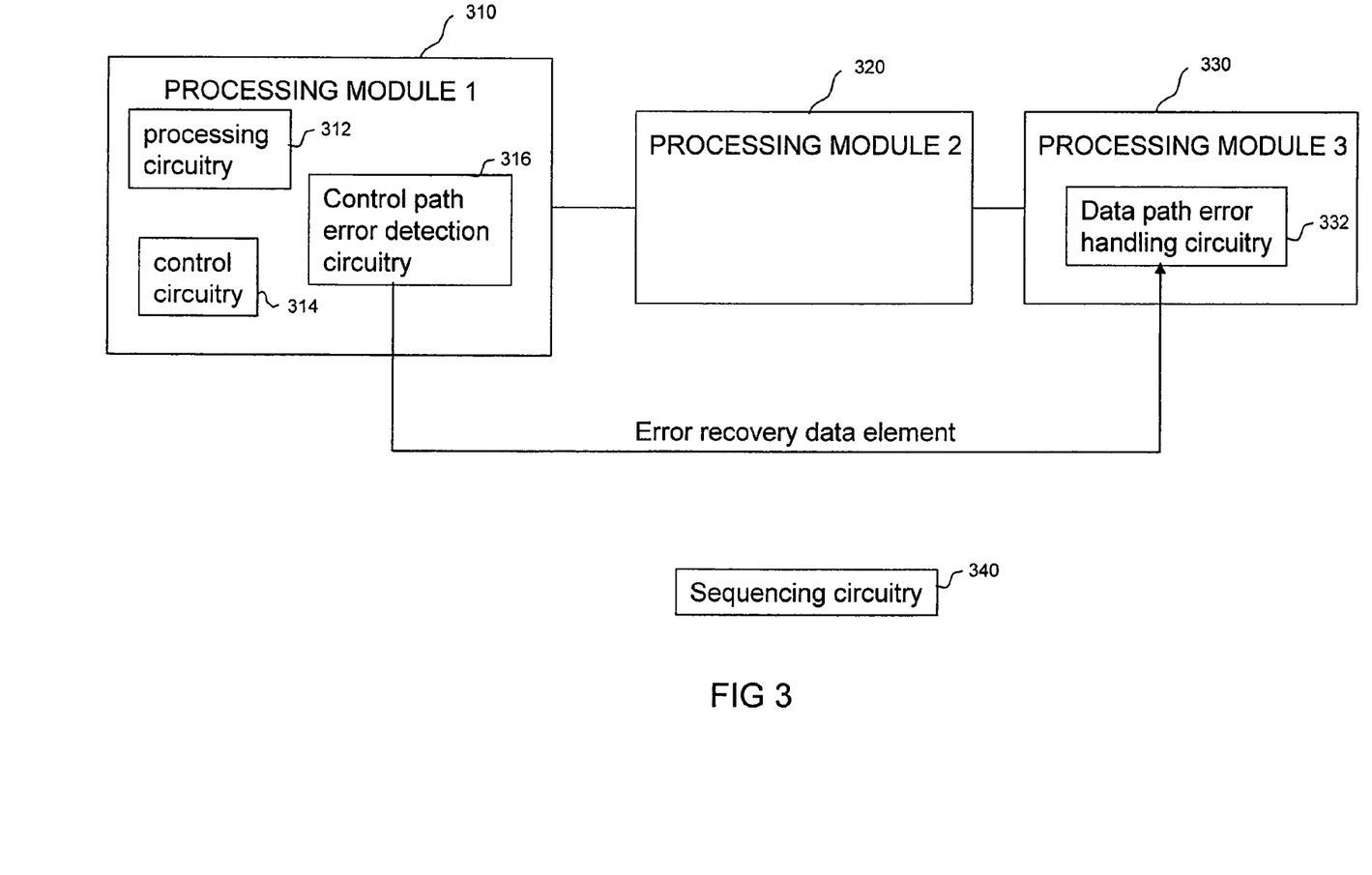
FIG. 3 schematically illustrates a data processing apparatus comprising a plurality of processing modules.

FIG. 3 schematically illustrates a data processing apparatus comprising a plurality of processing modules. The arrangement comprises a first processing module 310 having: processing circuitry 312, control circuitry 314 and control path error detection circuitry 316; a second processing module 320; a third processing module 330 having data path error handling circuitry 332; and sequencing circuitry 340. The first second and third processing modules 310, 320 and 330 are arranged in series and perform a respective series of processing tasks. The sequencing circuitry 340 oversees sequencing of processing tasks and performs co-ordination (synchronisation) of processing tasks between the three processing modules 310, 320, 330.

The first processing module 310 performs a particular processing task by executing program instructions using the processing circuitry 312. The control circuitry 314 controls the flow of execution. The control path error detection circuitry 316 of the first processing module 310 is configured to detect an error in the flow of execution of the processing circuitry. In this arrangement the control path error detection circuitry 316 comprises monitoring hardware which monitors assertions about the state of the processing circuitry 312. Upon detecting a control path error, the control path error detection circuitry 316 initiates output of an error recovery data element to the third processing module 330, bypassing the second processing module 320.

The error recovery data element output by the first processing module 310 comprises a predetermined data pattern that is recognisable by the third processing module 330 such that on encountering the error recovery data element, the third processing module 330 invokes the data path error handling circuitry 332 to enable recovery from the control path error without preventing forward-progress of the ongoing calculations.

In the event that no control path errors are detected by the control path error detection circuitry 316, the sequencing circuitry 240 ensures that the flow of execution is such that the first processing module 310 outputs data and supplies it as input to the second processing module 320 and that the second processing module 320 in turn outputs data and supplies it as input to the third processing module 330. However, in the event that the control path error detection circuitry 316 detects a control path error, the standard sequencing of processing operations is changed such that the sequencing circuitry 340 allows the second processing module 320 to be bypassed. In this case, the sequencing circuitry 340 aborts the processing operations of the processing module 310 and cleans up the state of the first processing module 310 (if required). The sequencing circuitry 240 ensures that execution continues despite detection of the control path error.

Although in the particular arrangement of FIG. 3, the error recovery data element comprises a predetermined bit-sequence, in alternative arrangements the error recovery data element may take a different form. The precise nature of the error recovery data element depends on the details of the processing task performed by the associated first processing module and indeed the processing task performed by the third processing module 330, which is the target destination of the error recovery data element. The size of the error recovery data element can be anything from a single bit in a custom ASIC up to blocks of thousands of data words in a DSP or CPU implementation.

The control path error detection circuitry 316 can take on a number of different forms in different embodiments, for example circuitry for detecting single-event upsets or watchdog timers arranged to monitor bus transactions, monitor reaching of internal mile posts or monitor completion of execution or processing corresponding to the particular processing module. Alternatively the control path error detection circuitry 316 could comprise a memory protection unit arranged to detect and prevent illegal memory accesses for the associated processing module. In yet further alternative embodiments the control path error detection circuitry 316 is associated with parity checking or general error correction control (ECC) checking mechanisms on instruction RAM.

In the arrangement of FIG. 3, the data processing apparatus is able to recover from the detected control path error arising in the first processing module 310 due to the fact that the control path error is effectively converted into a data path error via issuing of the error-recovery data element. The mechanisms for data path error suppression provided in the third processing module 330 are used to recover from the control path errors.

Figure 4:
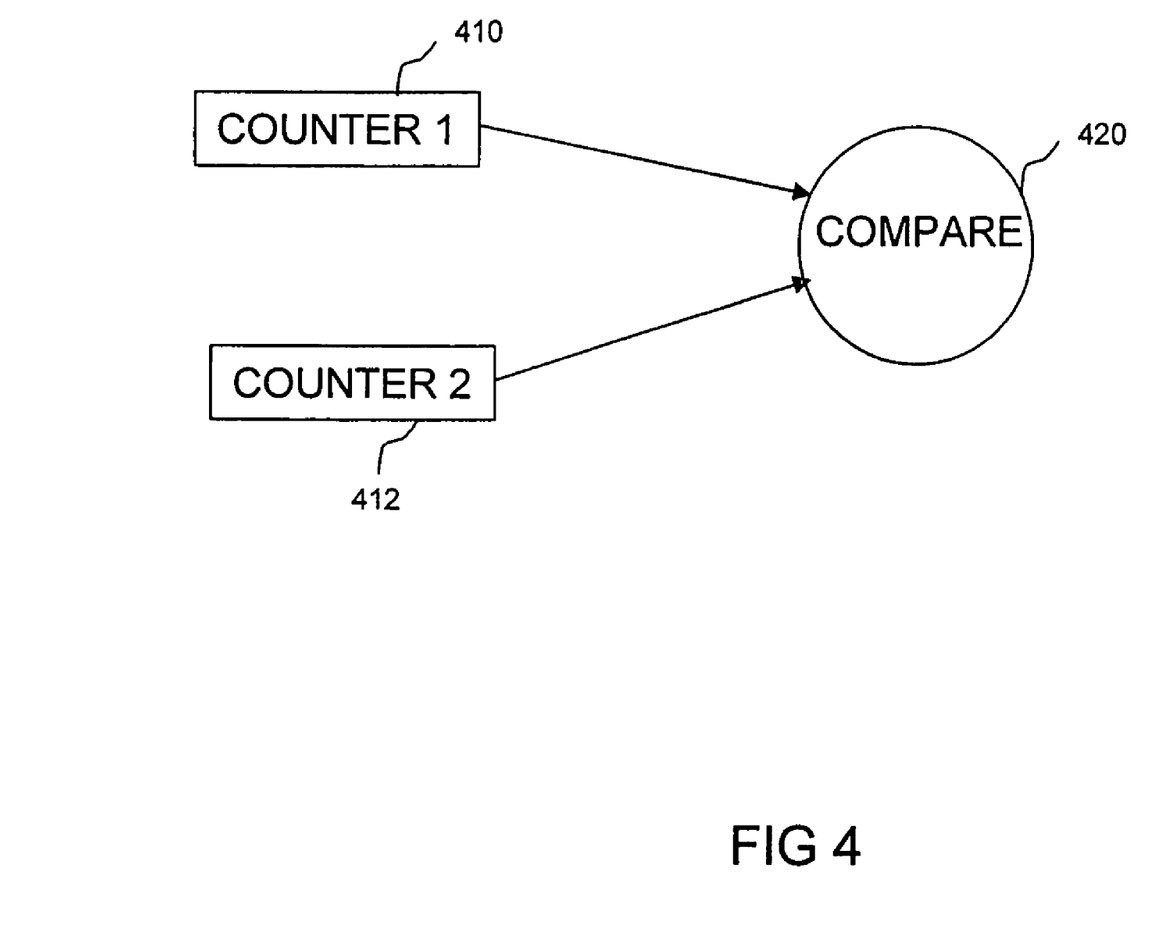
FIG. 4 schematically illustrates one embodiment of the control path error detection circuitry 316 of the apparatus of FIG. 3.

FIG. 4 schematically illustrates one embodiment of the control path error detection circuitry 316 of FIG. 3. The circuitry comprises a first counter 410, a second counter 412 and a comparison logic element 420. The first and second counters 410, 412 are arranged to count a value associated with control of execution of a processing task performed by the first processing module 310 and are both arranged to keep track of the same control value. If the comparison performed by the comparison logic element 420 indicates that there is any difference in the two counter values then the occurrence of a control plane error is flagged by the control path error detection circuitry 316 and the error recovery data element is output to the third processing module 330.

Figure 5A:
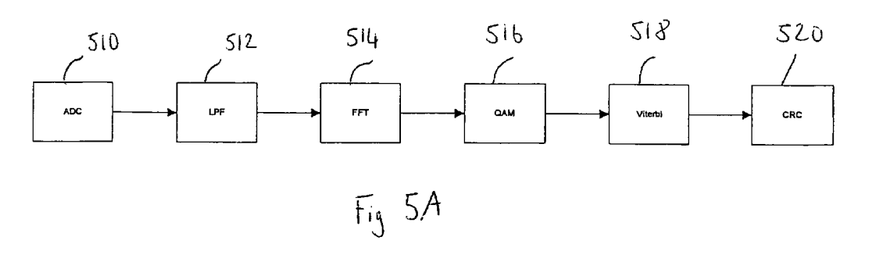
FIGS. 5A, 5B and 5C schematically illustrate a plurality of digital signal processing (DSP) kernels connected together in a data flow graph that illustrates a sequence of processing operations performed by the respective DSP kernels.
Figure 5B:
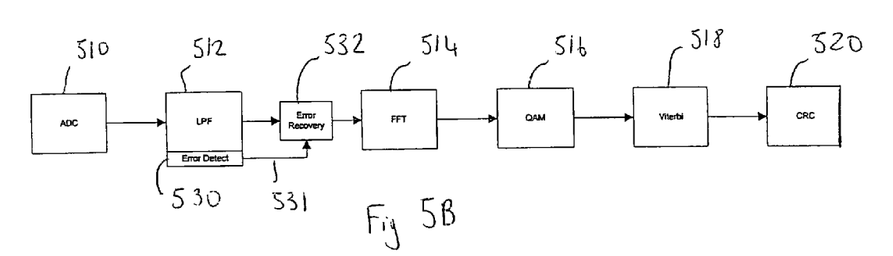
Figure 5C:
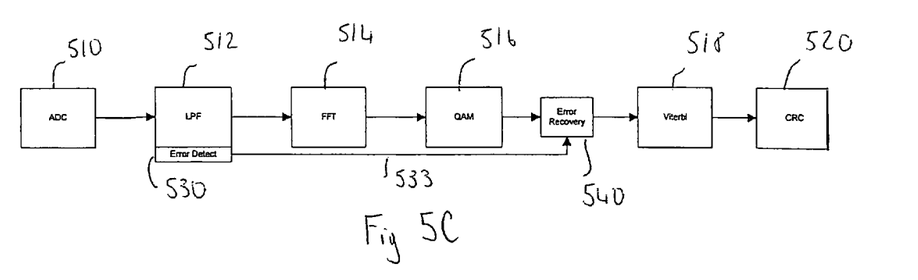

FIGS. 5A, 5B and 5C schematically illustrate a data processing apparatus comprising a plurality of digital signal processing (DSP) kernels connected together in a data flow graph that illustrates a sequence of processing operations performed by the respective DSP kernels. FIG. 5A shows the basic arrangement comprising: an analogue-to-digital converter kernel 510, a low-pass filter (LPF) kernel 512, a Fast Fourier Transform (FFT) kernel 514, a Quadrature Amplitude Modulation (QAM) kernel 516, a Viterbi kernel 580 and a cyclic redundancy check (CRC) kernel 520.

The ADC kernel 510 takes an input analogue signal and converts it to a digital output signal for supply as input to the LPF kernel 512. The LPF kernel 512 passes low frequency digital signals but attenuates signals with frequencies higher than a characteristic cut-off frequency associated with the low-pass filter. The output of the LPF kernel 512 is supplied as input to the FFT kernel 514, which executes an algorithm to compute a discrete Fourier transform on the input data, which provides a frequency spectrum analysis of the low-pass filtered data. The output of the FFT kernel 514 is supplied as input to the QAM kernel, 516, which performs digital amplitude demodulation on the data output by the FFT kernel 514. The Viterbi kernel 518 performs Viterbi decoding on the received data to recover information that was previously Viterbi encoded (e.g. by a transmitter) using a Viterbi algorithm. The Viterbi algorithm is commonly used in DSP applications and is a forward error correction scheme based on a convolutional code.

The final processing kernel is the CRC kernel 520 that performs a cyclic redundancy check, which is used as a check sum to detect an accidental alteration of data during transmission.

In the arrangement of FIG. 5A each processing kernel is implemented by a respective digital signal processor. It is clear that in the system of FIG. 5A, each processing kernel is reliant upon correct operation of processing kernels upstream of the given kernel to ensure forward-progress of a given calculation. For example, should a control path error arise in the ADC kernel 510, this would have an impact on the processing performed by all of the subsequent processing kernels 512, 514, 516, 518 and 520. In the data processing system illustrated by FIG. 5A, each individual kernel has a basic error-recovery mechanism operating at local (i.e. kernel-based) level.

FIG. 5B schematically illustrates a data processing system as illustrated by FIG. 5A in which error detection circuitry and error recovery circuitry associated with the LPF kernel 512 is shown. In particular, the LPF kernel 512 of FIG. 5B comprises error detection circuitry 530 configured to monitor processing operations performed by the LPF kernel to detect any control path errors and to insert an appropriate error recovery data element into an associated LPF output error recovery buffer 532 if the LPF kernel 512 encounters an error.

The error detection circuitry 530 detects any control path errors associated with sequencing or control of execution of the low pass filtration operations performed by the LPF kernel 512 and causes an error-recovery data element to be output via path 531 into the error recovery buffer 532. The error recovery data element effectively converts the detected control path error into an error than can be handled by data path error handling circuitry. In the particular arrangement of FIG. 5B, the error recovery data element serves to fill the error recovery buffer 532 with zeros. An all zeros data element represents a safe input for the subsequent FFT processing kernel 514.

Some DSP kernels, depending on the associated processing function, require that all input values are within the certain range between a minimum and a maximum value or that the average values of a series of input values is within a certain range to guarantee correct operation. Accordingly, in alternative arrangements to that of FIG. 5B, the error-recovery data element stored in the error recovery buffer 532 is generated to have a value that satisfies the requirements of the subsequent processing kernel 514. Some processing kernels (such as those attached directly to transducers) are capable of accepting random input data. In such alternative embodiments if the error detection circuitry 530 detects a control path error part way through a calculation, even a partially constructed output buffer may be used (unmodified) yet enable data processing to continue.

The Viterbi kernel 514 executes a soft-input Viterbi decoding algorithm, which requires as inputs a list of bit values and an associated with each input bit value a probability that the corresponding bit value is correct. Thus if a control path error is detected upstream of the Viterbi kernel 518, the corresponding processing kernel that detected the error is arranged to output error recovery data elements comprising a block of data for input to the Viterbi kernel in which all of the probabilities of bit values associated with the control path error are arranged to be extremely low. The low probabilities reflect the fact that the error recovery data elements whose output is initiated by the control path error detection circuitry bear no relation to the input data.

The QAM kernel 516 executes a soft-output QAM slicer which produces along with output data values corresponding probabilities that the bits are correct such that if a data value is close to a reference point the probability is high but if a data value is midway between two reference points, the probability is low. Thus for the soft-output QAM slicer kernel 516, error recovery data elements generated in response to detection of a control plane error comprise a set of data points midway between two reference points reflecting the fact that the output of the QAM kernel is unreliable.

In the event that the LFP kernel 530 has produced some output data prior to the detected control path error (assuming that detection of the error closely follows the control path failure) the output data the occurred prior to the error detection is passed into the error recovery buffer 532 unchanged and only the remaining (i.e. incorrect) part of the output data is modified by the error detection circuitry 530 such that it represents one or more error recovery data elements.

In the arrangement of FIG. 5C the error detection circuitry 530 of the LPF kernel 512 detects a control path error in the low pass filtration process and generates an error recovery data element which bypasses the subsequent kernels 514, 516 and is instead supplied via path 533 to an alternative error recovery buffer 540 prior to the Viterbi kernel 518. Thus in the arrangement of FIG. 5C, the control path error-recovery mechanism is implemented such that if a control path error is detected early in the pipeline of DSP kernels (i.e. at the LPF kernel 512) then the error recovery is performed by the data path error handling circuitry can be performed later in the pipeline (i.e. by Viterbi kernel 518).

In the arrangement of FIG. 5C when a control path error is detected in the LPF kernel 512, both the FFT kernel 514 and the QAM kernel 516 are bypassed, but the Viterbi kernel 518 and the CRC kernel 520 continue to execute processing operations.

Note that in the arrangements of FIG. 5A and FIG. 5C, the error detection circuitry 530 is shown associated with the LPF kernel, in alternative arrangements error-detection circuitry can be added to a different one of the plurality of processing kernels or indeed to more than one processing kernel.

Figure 6:
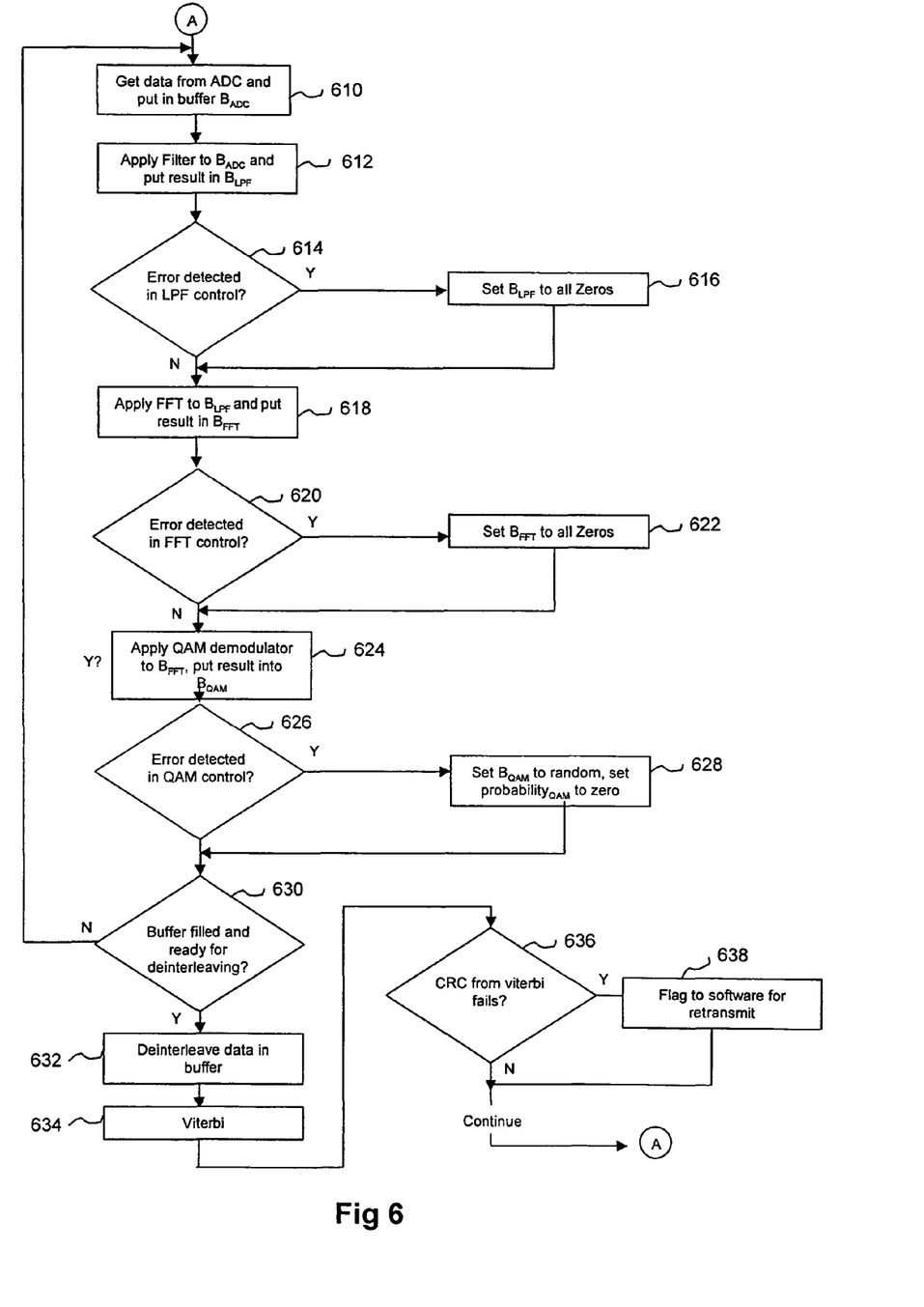
FIG. 6 is a flow chart that schematically illustrates processing stages associated with a data processing apparatus similar to that illustrated in FIG. 5B.

FIG. 6 is a flow chart that schematically illustrates processing stages associated with the data processing apparatus of FIG. 5B. In particular, the flow chart of FIG. 6 illustrates the sequence of processing operations performed in a data processing apparatus having a plurality of processing modules in which none of the processing modules is bypassed even when a control path error is detected. In the arrangement of FIG. 5A only a single buffer is shown, i.e. the error recovery buffer 532 which is associated with the LPF kernel 512. However, it will be appreciated that each of the kernels 510, 512, 514, 516 and 518 comprises an associated buffer (not shown) into which output data is stored prior to transmission to the subsequent processing kernel.

The process of FIG. 6 begins at stage 610 where the results of the ADC conversion performed by ADC kernel 510 are stored in the associated buffer $B_{ADC}$. The process then proceeds to stage 612 whereupon the LPF kernel 512 applies a low pass filter to data from the buffer $B_{ADC}$. Next, at stage 614, it is determined whether or not a control path error is detected in the LPF kernel 512. If a control path error is in fact detected, then the process proceeds to stage 616 whereupon the data in the output buffer $B_{LPF}$ of the LPF kernel is set to all zeros and then the processing operations continue.

If, on the other hand, at stage 614 no error is detected in the operation of the LPF kernel 512 then the data in the associated output buffer is not modified and the process proceeds to stage 618. At stage 618 a Fast Fourier Transform is applied to data from the buffer $B_{LPF}$ and the results of the Fourier Transform are stored in the associated buffer $B_{FFT}$. Next, at stage 620, it is determined whether or not a control path error associated with operation of the FFT kernel 514 has been detected.

If an error has in fact been detected, then the associated buffer $B_{FFT}$ has data stored therein modified such that it is set to all zeros then processing continues to stage 624. If, on the other hand, it is determined at stage 620 that no control path error has occurred then the process proceeds directly to stage 624 with no modification of data stored in the buffer $B_{FFT}$ being performed. At stage 624 quadrature amplitude demodulation is applied to data retrieved from the buffer $B_{FFT}$ and the results of the demodulation are stored in the buffer $B_{QAM}$ associated with the QAM kernel 516. Next, at stage 626, it is determined whether or not an error is detected in processing operations performed by the QAM kernel 516. If a control path error is detected at stage 626, the process proceeds to stage 628 whereupon data in the output buffer $B_{QAM}$ of the QAM kernel is set to a random value, the probability of the QAM entry set to zero and the processing continues to stage 630. If, on the other hand, the demodulation is performed without any control path errors having been detected at step 626 then no modification of data stored in the buffer is performed and the process proceeds directly to stage 630.

At stage 630 it is determined whether or not the buffer $B_{QAM}$ storing the output of the demodulation has been filled and is ready for de-interleaving. If it is determined that the buffer is not yet full, then the process returns to the beginning of the sequence of operations and starts again at stage 610 until the point at which the output buffer $B_{QAM}$ is filled and ready for de-interleaving.

If it is determined at stage 630 that the buffer is in fact full and ready for a de-interleaving then the process proceeds to stage 632 where de-interleaving of output data in the buffer is performed. Next at stage 634 the Viterbi kernel 518 performs Viterbi decoding on the de-interleaved data. The Viterbi may be able to recover from the error, but if the error remains then it will be detected by a CRC failure. The process then proceeds to stage 636 whereupon the CRC kernel 520 performs a cyclic redundancy check on the output of the Viterbi decoding.

If the check at stage 636 is unsuccessful (indicating that the decoded data is corrupt) then the process proceeds to stage 638 whereupon data path error handling circuitry (and associated software) flags for a retransmission of data from the transmitter.

If, on the other hand, the cyclic redundancy check is successful at stage 636 processing continues and returns to point A at the beginning of the flow chart. In the processing of FIG. 6, the setting of the buffer data to all zeros at stages 616, 622 and 628 in the event that the corresponding processing kernel encounters a control path error forces a cyclic redundancy check failure in the CRC kernel 520. A cyclic redundancy check failure is a mechanism provided to handle a data path error involving errors in the decoded data e.g. due to excessive noise on a communication channel. This data path error handling mechanism has been redeployed to effect correction of detected control path errors in the LPF kernels without requiring a complete reset of the associated data processing apparatus.

In this embodiment, even if an error is detected in LPF kernel 512, the subsequent processing kernels still continue to perform their allocated processing tasks based on data output by the previous processing kernel.

The processing in the flow chart of FIG. 6 (corresponding to the data processing apparatus of FIG. 5B) is shown as a sequence of steps performed by the series-connected kernels of FIG. 5B. It should be noted that, the processing illustrated in the stages of the flow chart of FIG. 6 (and also of FIG. 7 below) could be performed (at least in part) in parallel by a plurality of processing kernels, each kernel performing a different task. Alternatively the same processing engine can be used to performing all of the steps, one kernel at a time.

Figure 7:
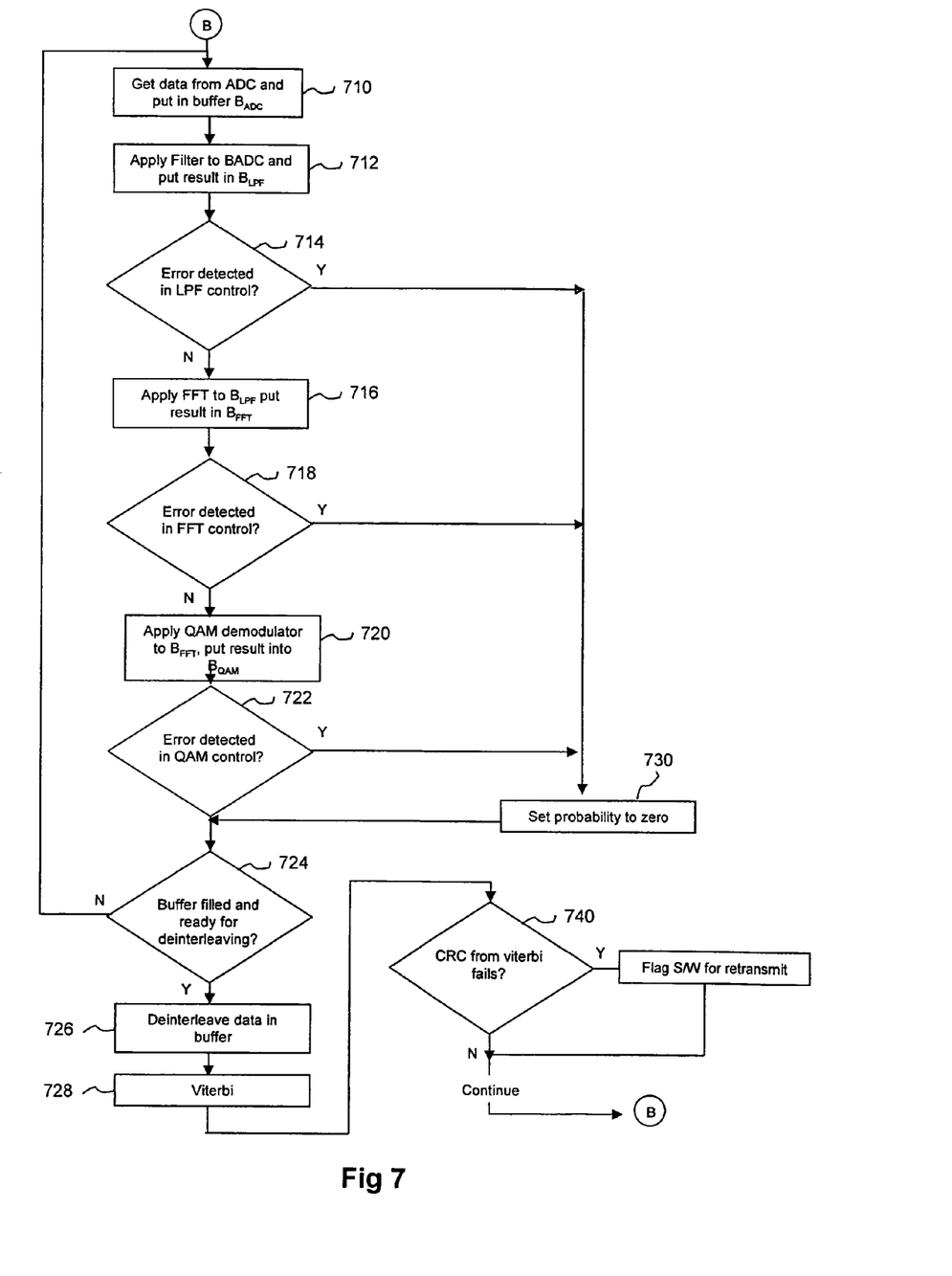
FIG. 7 is a flow chart that schematically illustrates how a control plane error in the data processing apparatus of FIG. 5C is translated into a forwarded data error.

FIG. 7 is a flow chart that schematically illustrates how a control plane error in the data processing apparatus of FIG. 5C is translated into a forwarded data error for which error recovery is performed by a downstream kernel. The process of FIG. 7 differs from the process of FIG. 6 in that one or more processing kernels can be bypassed in the event that a control path error is detected in a preceding processing kernel.

The process begins at stage 710 where data is output by the ADC kernel 510 and stored in the associated buffer $B_{ADC}$. The process then proceeds to stage 712, where the low pass filter is applied to data from the buffer $B_{ADC}$ and the results of the filtration are stored in the buffer $B_{LPF}$. Next at stage 714 it is determined whether or not the control path error has occurred in the processing performed by the LPF kernel 512. If no control path error is detected, then the process proceeds to stage 716 whereupon the Fast Fourier Transform is applied by the FFT kernel 514 to data from the buffer $B_{LPF}$ and the results are stored in the output buffer $B_{FFT}$ of the FFT kernel.

Next, at stage 718, it is determined whether or not a control path error has been detected in the FFT kernel 514. If no error in the FFT kernel is detected then the process proceeds to stage 720 where demodulation is performed by the QAM kernel 516 on data retrieved from the buffer $B_{FFT}$ and the results of the demodulation are stored in the buffer $B_{QAM}$. Next at stage 722 it is determined whether or not a control path error has been detected in the operation of the QAM kernel 516. If no error is detected then the process proceeds to stage 724.

If at any of the stages 714, 718 or 722 a control path error is in fact detected in the respective kernel (i.e. the LPF kernel 512, the FFT kernel 514 or the QAM kernel 516) then the process proceeds to stage 730 where the probabilities associated with the output of the QAM kernel 516 are set to zero. Effectively this means that if an error occurs in the LPF kernel 512 then the FFT kernel 514 and the QAM kernel 516 are bypassed.

Similarly if control path error is detected in the FFT kernel 514 then the processing that the QAM kernel is configured to perform is bypassed although the associated buffer is filled with zeros for input to the Viterbi kernel 518. Stage 722 and stage 730 of the flow chart of FIG. 7 both lead directly to stage 724 where it is determined whether or not the output buffer of the QAM kernel i.e. $B_{QAM}$ is full and ready for de-interleaving.

If the buffer is not yet full, then the process returns to stage 710. However, if at stage 724 it is determined that the buffer is full and ready for de-interleaving then the de-interleaving is performed at stage 726 and subsequently, at stage 728, Viterbi decoding is performed on the de-interleaved data. Next at stage 740 it is determined whether or not the cyclic redundancy check associated with CRC kernel 520 passes or fails. The process continues and returns to stage 710 if the cyclic redundancy check is successful. However, if the cyclic redundancy check fails at stage 740, then at stage 742 the data path error handling software is triggered to initiate a retransmission of data to resolve the problem. Filling the output buffer of the QAM kernel 516 with zeros has the effect of forcing a fail of the cyclic redundancy check performed by the CRC module 520. Thus the data path error handling circuitry that initiates retransmission of data is used to force the apparatus to recover from detected errors in the control path at stages 714, 718 or 722.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:
   processing circuitry for performing at least one of a series of data processing operations in dependence upon a set of data values;
   control circuitry for controlling execution of said data processing operations;
   control path error detection circuitry for detecting a control path error associated with an error in operation of said control circuitry;
   data path error handling circuitry arranged to handle recovery from errors in said data values;
   wherein said control path error detection circuitry is coupled to said data path error handling circuitry and is configured to cause said data path error handling circuitry to perform recovery from said control path error thereby enabling said series of data processing operations to continue.

2. Apparatus according to claim 1, wherein said control path error detection circuitry is arranged to cause said recovery by providing an indication of said control path error by triggering generation of an error-recovery data element and wherein said error-recovery data element is supplied to said data path error handling circuitry.

3. Apparatus according to claim 2, wherein said error-recovery data element comprises a predetermined data pattern.

4. Apparatus according to claim 3, wherein said data path error handling circuitry is responsive to said predetermined data pattern to initiate said recovery from said control path error.

5. Apparatus according to claim 3, wherein said predetermined data pattern comprises a plurality of data values each of which has a magnitude within a predetermined range.

6. Apparatus according to claim 2, wherein said error-recovery data element is a modified version of a calculation result of one of said series of data processing operations.

7. Apparatus according to claim 6, wherein said calculation result comprises a probability value and wherein said modified version comprises a modified probability value.

8. Apparatus according to claim 1, wherein said data processing apparatus comprises a plurality of processing modules and wherein each of said plurality of processing modules performs a respective processing function.

9. Apparatus according to claim 8, wherein at least a subset of said plurality of processing modules are connected in series and arranged to perform a respective series of data processing functions.

10. Apparatus according to claim 8, wherein said control path error detection circuitry detects occurrence of a control path error in a given one of said plurality of processing modules.

11. Apparatus according to claim 10, wherein said control path error detection circuitry is arranged to cause said data processing apparatus to bypass one or more subsequent processing functions of said series in response to said detection of said control path error in said given processing module.

12. Apparatus according to claim 10, wherein said data path error handling circuitry is associated with a further one of said plurality of processing modules different from said given processing module.

13. Apparatus according to claim 12, wherein said error-recovery data element is supplied to said further processing module thereby enabling said series of processing functions to continue despite occurrence of said control path error.

14. Apparatus as claimed in claim 8, wherein said plurality of processing modules comprises at least one of: a digital signal processor, a processing engine, a general-purpose CPU, a programmable accelerator and a fixed-function accelerator.

15. Apparatus according to claim 1, wherein said control circuitry comprises a state machine.

16. Apparatus according to claim 15, wherein said control path error detection circuitry detects said control path error in dependence upon said state machine.

17. Apparatus according to claim 1, wherein said control path error is an error associated with at least one of a timing error, an intermittent hardware error, a hardware failure and a hardware design error.

18. Apparatus as claimed in claim 1, wherein said control path error detection circuitry comprises at least one of: a watchdog timer, a value-comparison circuit, a memory protection unit and a single-event-upset detection circuit.

19. Apparatus as claimed in claim 1, wherein said data path error handling circuitry invokes error-handling software.

20. A data processing method comprising:
   performing a plurality of data processing operations on a set of data values in dependence upon one or more program instructions;
   controlling execution of said program instructions using control circuitry; detecting a control path error associated with an error in operation of said control circuitry;
   handling recovery from data path errors corresponding to errors induced in said set of data values by said data processing operations using a data path error handling mechanism;
   wherein an indication that a control path error has occurred is provided to said data path error recovery mechanism and wherein said data path error handling mechanism is responsive to said indication to trigger recovery from said control path error.

21. A computer program product including a non-transitory computer readable storage medium carrying a computer program for controlling operation of a data processing apparatus having processing circuitry for performing at least one of a series of data processing operations in dependence upon a set of data values and control circuitry for controlling execution of said data processing operations, said computer program product comprising:
   control path error detection code for detecting a control path error associated with an error in operation of said control circuitry;
   data path error handling code for handling recovery from errors in said data values;
   wherein said control path error detection code invokes said data path error handling code to perform recovery from said control path error thereby enabling said series of data processing operations to continue.

* * * * *